No. 755,929. PATENTED MAR. 29, 1904.
S. H. POCOCK.
CASH REGISTER.
APPLICATION FILED DEC. 31, 1902.
NO MODEL. 5 SHEETS—SHEET 1.
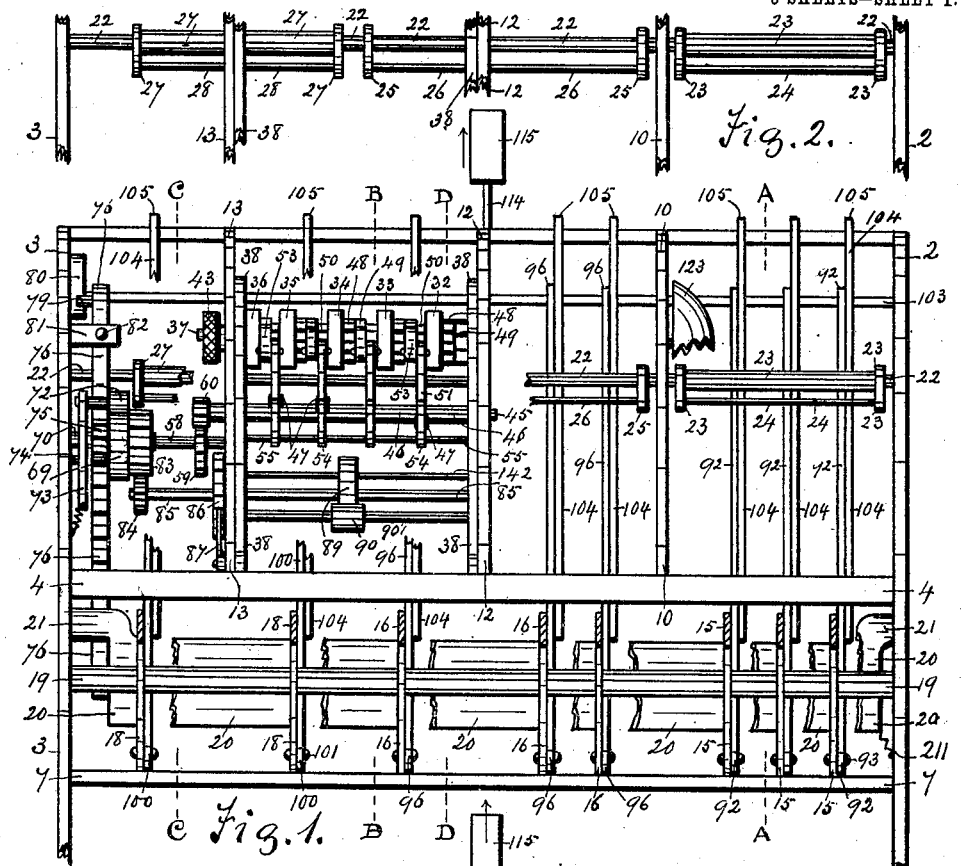
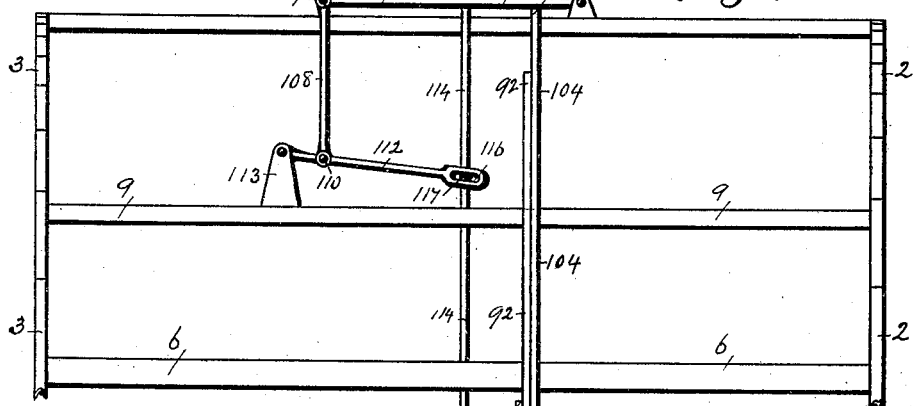
Witnesses. Inventor.

No. 755,929. PATENTED MAR. 29, 1904.
S. H. POCOCK.
CASH REGISTER.
APPLICATION FILED DEC. 31, 1902.
NO MODEL. 5 SHEETS—SHEET 2.
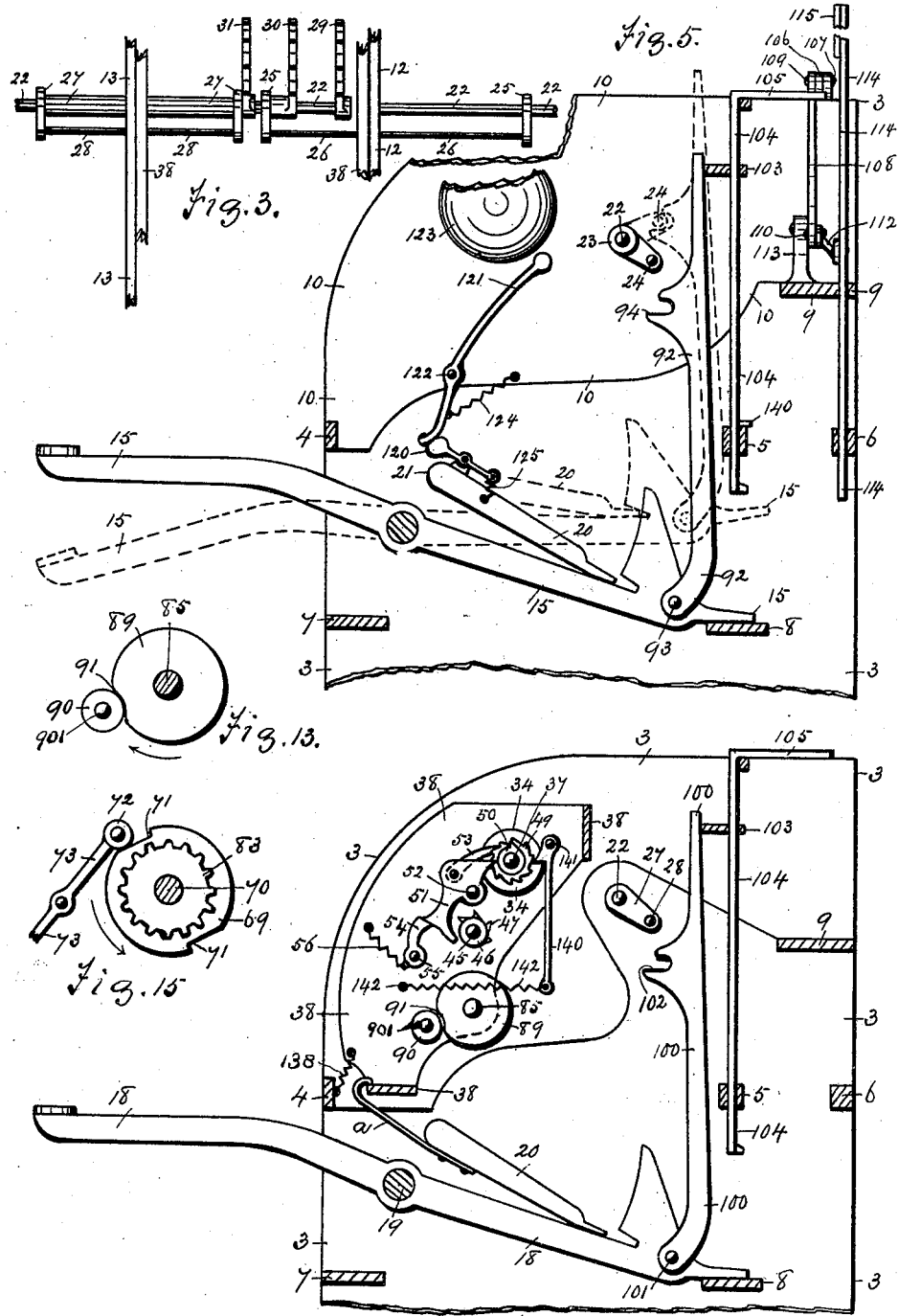

No. 755,929. PATENTED MAR. 29, 1904.
S. H. POCOCK.
CASH REGISTER.
APPLICATION FILED DEC. 31, 1902.
NO MODEL. 5 SHEETS—SHEET 3.
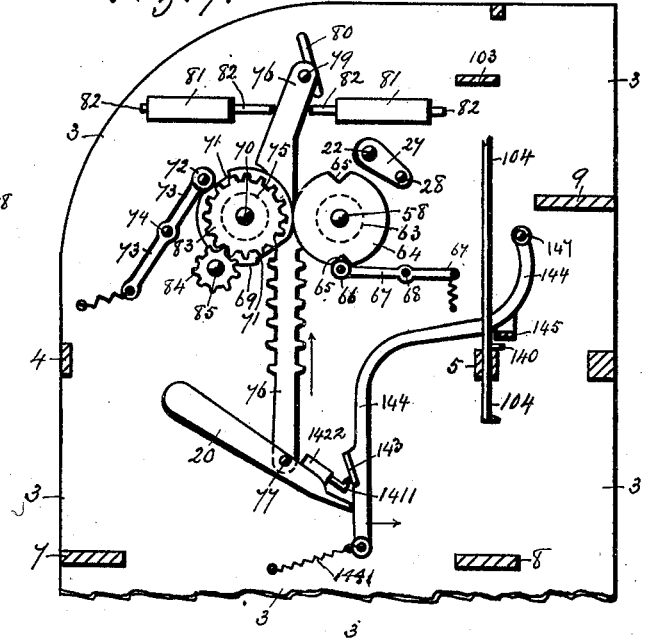
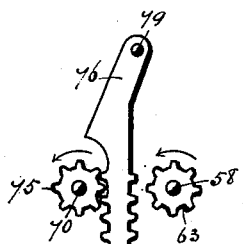
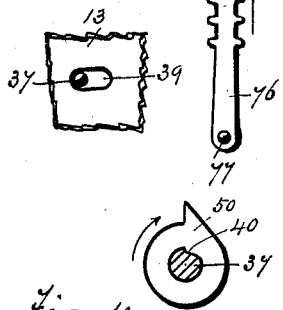
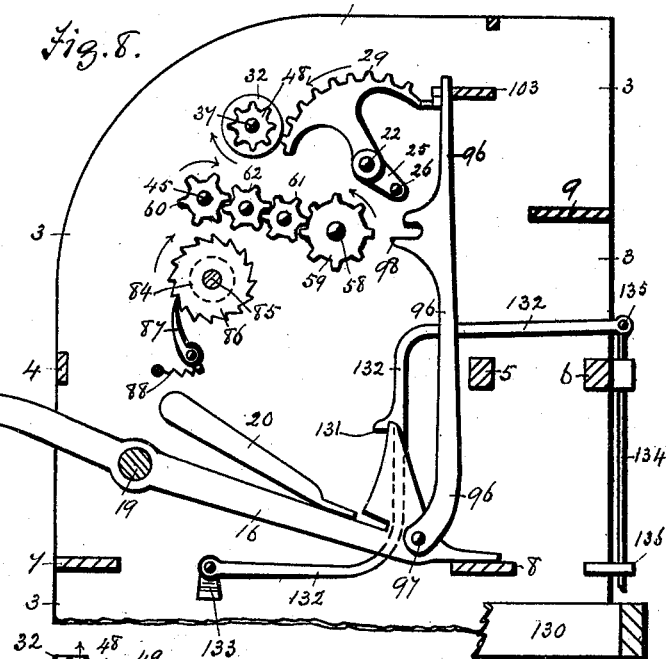
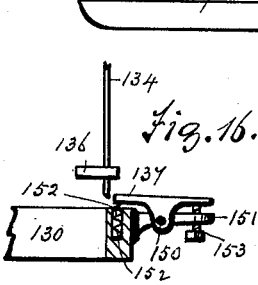
Witnesses.
Inventor
Stephen Harry Pocock
By John K. Hendry, Atty.

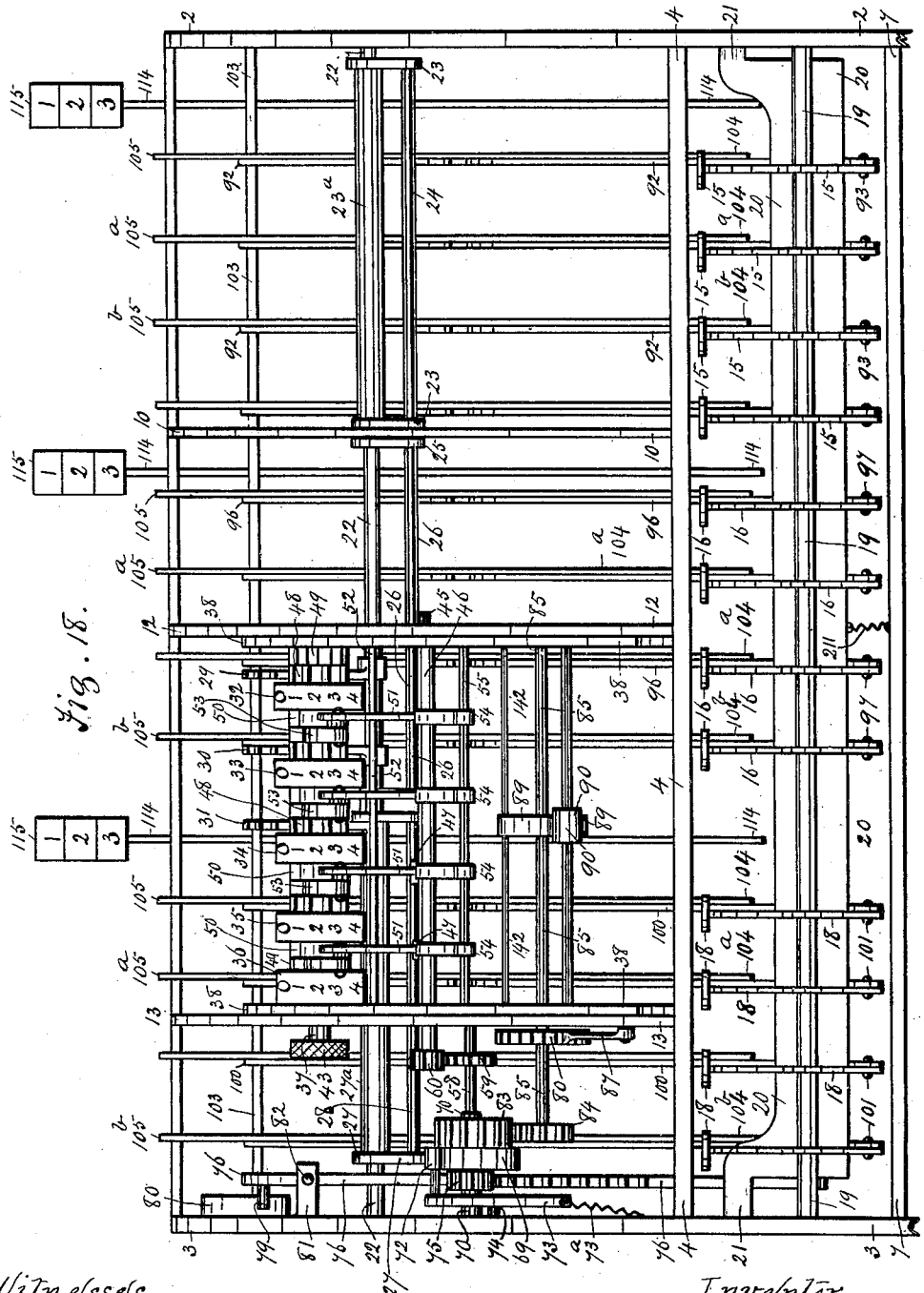

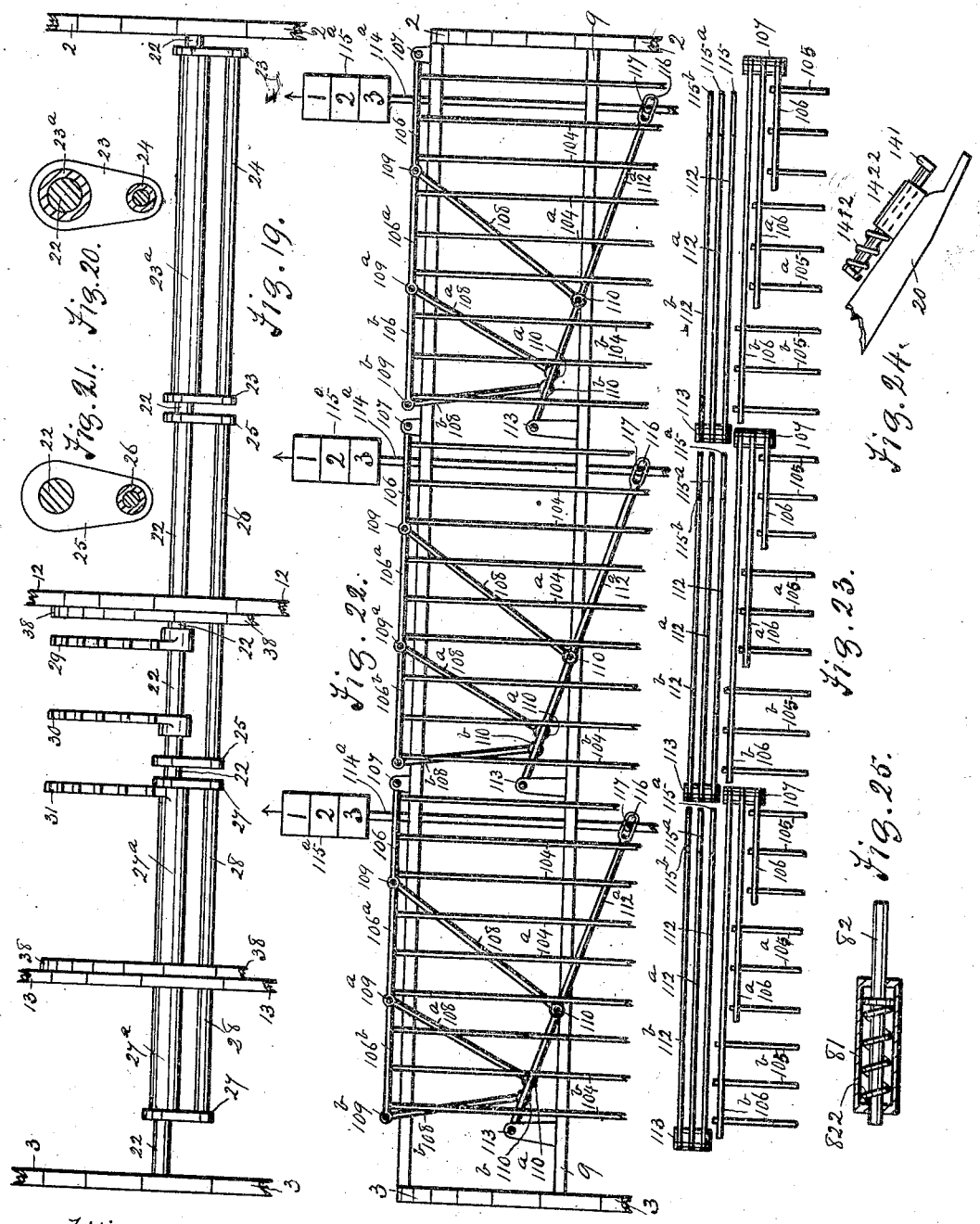

No. 755,929.                                                                 Patented March 29, 1904.

UNITED STATES PATENT OFFICE.

STEPHEN HARRY POCOCK, OF HAMILTON, CANADA.

CASH-REGISTER.

SPECIFICATION forming part of Letters Patent No. 755,929, dated March 29, 1904.

Application filed December 31, 1902. Serial No. 137,233. (No model.)

*To all whom it may concern:*

Be it known that I, STEPHEN HARRY POCOCK, a citizen of Canada, residing at Hamilton, in the county of Wentworth and Province of Ontario, Canada, have invented certain new and useful Improvements in Cash-Registers, of which the following is a specification.

My invention relates to improvements in cash-registers in which certain banks or sections, representing units, tens of units, and hundreds of units, are operated by certain levers or keys, and the units, tens of units, and hundreds of units indicated on the periphery of corresponding numeral-disks when the same are actuated by mechanism connected with the disks and the keys, and mechanism for indicating the amount of each registration.

The objects of my invention are, first, to provide a cash-register that shall be capable of registering the amount indicated by the operated key or keys representing said amount; second, to provide means for indicating on tablets the amount registered, and, third, to afford facilities for the perfect adjustment of the operating parts at the commencement of a day or term of time. I attain these objects by the mechanism illustrated in the accompanying drawings, in which—

Figure 1 is an elevation of the stationary framework and of several of the operating parts of the mechanism of the cash-register, showing sections of a number of the operating-keys, a part of the rocking frames being broken away in order not to complex the numeral-disks and their mechanism. Fig. 2 is an elevation of the rocking frames, showing position of a part of said frames which are broken in Fig. 1 of the drawings. Fig. 3 is an elevation of a part of the rocking frames, as in Fig. 2 of the drawings, and showing the toothed segments which gear into the spur-wheels forming a part of the numeral-disks. Fig. 4 is an elevation of the rear part of the machine, the principal mechanism being removed in order to show the mechanism for raising the indicators or indicating-tablets. Fig. 5 is a side elevation of the machine through the broken line A A of Fig. 1 of the drawings and units-section of the machine, showing a key with pivotal lifting-rod, the key-coupler with bell mechanism, and the rocking frame and mechanism for operating the indicating-tablets. Fig. 5 of the drawings, together with the following side elevations, are all viewed from the right-hand side of the machine. Fig. 6 is a side elevation of the adding device through the broken line B B of Fig. 1 of the drawings, showing the ratchet-wheel forming a part of one of the numeral-disks and showing the left-hand side of the pivotal adding-device frame, both sides of which are similar. Fig. 7 is a side elevation of the machine through the broken line C C of Fig. 1 of the drawings, showing the double-rack-motion mechanism and means for retaining the mechanism in gear. Fig. 8 is a side elevation of the machine through the broken line D D of Fig. 1 of the drawings, showing the mechanism for operating the spur-wheel of one of the numeral-disks in the adding device, the standard 13 and a side of the pivotal numeral-frame being removed to show the small transfer spur-wheels in gear. Fig. 9 is a side elevation of the detached double rack in gear and in normal position. Fig. 10 is an enlarged detail side elevation of a cam of a numeral-disk. Fig. 11 is an enlarged detail side elevation of a numeral-disk on the shaft of the pivotal adding-device frame, showing the horizontal slot in the shaft and the pawl pivotally connected to the recessed side of the disk and engaged with the shaft. Fig. 12 is a side elevation of a part of the standard 13, showing the slot to allow the adding-device frame to rock. Fig. 13 is an enlarged side elevation of the cam to rock the pivotal adding device into gear and the cam-roller of the adding device. Fig. 14 is an enlarged side elevation of the revoluble transferring shaft and sleeve with different positioned arms. Fig. 15 is an enlarged side elevation of the retaining-cam, showing a spring-roller in one of its depressions. Fig. 16 is an elevation of a drawer broken, showing mechanism for retaining said drawer. Fig. 17 is an enlarged detail elevation of a numeral-disk with its spur-wheel, rack-wheel, and cam-wheel. Fig. 18 is an enlarged elevation of the cash-register, showing several of the operating parts of the mechanism in normal position. Fig. 19 is an enlarged elevation of the rock-frames, the standards of the machine broken, the ends of the adding-device frame broken, and the toothed segments which gear into the numeral-disk wheels. Fig. 20 is an enlarged section of the numeral rock-frame, showing the roller 24. The hundreds-of-units rock-frame at the left-hand side of Fig. 19 of the drawings is similar in construction and section as the numeral rock-frame in Fig. 20 of the drawings. Fig. 21 is an enlarged section of the tens-of-units rock-frame, showing the roller 26. Fig. 22 is an enlarged elevation of the rear part of the machine, showing mechanism for operating or lifting the indicating-tablets 115 and also part of the mechanism for operating the indicating-tablets 115$^a$ and 115$^b$, which are immediately in rear of the tablets 115. Fig. 23 is a plan of a part of Fig. 22 of the drawings, several of the operating parts being shown a distance apart in order to more fully understand the same. Fig. 24 is an enlarged end elevation of a part of the coupler with the pulling spring-plunger shown in Fig. 7 of the drawings. Fig. 25 is an enlarged end elevation of a spring-plunger which engages with the double rack shown in Fig. 7 of the drawings.

Similar characters refer to similar parts throughout the several views.

In the drawings the vertical side standards of the machine are indicated by 2 and 3, respectively, the lower ends of which are shown broken and may extend and be formed to an approved depth and design for a slidable cash-exchange drawer.

To retain the side standards in vertical and rigid position with each other, horizontal bars 4, 5, 6, 7, 8, and 9, respectively, are provided, which connect and are secured to said sides 2 and 3.

The stationary midway vertical standards 10, 12, and 13, respectively, are located between the stationary side standards 2 and 3 and at approved distance apart to suit the number and location of the several operating levers or keys. The operating-keys alluded to for operating the numeral-disks are indicated by 15, a few of which are shown in Fig. 1 of the drawings. The operating-keys for operating the tens-of-units disks are indicated by 16, a few of which are shown in Fig. 1 of the drawings, and the operating-keys for operating the hundreds-of-units disks are indicated by 18, a few of which are shown in Fig. 1 of the drawings. The operating-keys referred to are all fulcrumed loosely on the horizontal bar 19, which is rigidly connected to the sides 2 and 3 of the machine. The horizontal key-coupler 20 extends from side 2 to side 3 and is pivoted or journaled at 21 to and between said sides. The horizontal rock-frame shaft 22 extends from side 2 to side 3 of the machine and is loosely journaled in said sides.

The units rock-frame 23 comprises two arms 23, connected by a sleeve 23$^a$ and forming one piece of mechanism, which is secured to the shaft 22 and rocks with said shaft. A horizontal roller 24 is journaled in said arms.

The tens-of-units rock-frame comprises two arms 25, provided with a horizontal roller 26 and is capable of oscillating on the shaft 22 as a rock-frame independent of the rock of the shaft 22.

The hundreds-of-units rock-frame comprises two arms 27, connected by a sleeve 27$^a$ and forming one piece and is capable of rocking loosely and independently on the shaft 22. The arms 27 carry the roller 28.

The toothed segment 29 (shown in Figs. 3 and 8 of the drawings) is secured to the shaft 22 and rocks with the shaft. The toothed segment 30 (shown in Fig. 3 of the drawings) is secured to the left-hand end of the rock-frame 25 and rocks with said frame. The toothed segment 31 (shown in Fig. 3 of the drawings) is secured to the right-hand side of the rock-frame 27. The segments 29, 30, and 31 are similar to each other and are located directly opposite to the numeral-disk wheels in order to gear into the same.

The numeral-disks 32, 33, 34, 35, and 36 are shown in Fig. 1 of the drawings and are capable of revolving loosely on their horizontal shaft 37, which is journaled in the adding-device frame 38. (Shown in Figs. 1 and 6 of the drawings.) The coupler 20 is provided with a bent arm $a$ to engage and hold the adding-device frame 38 at normal position. The shaft 37 passes freely through a slot 39 in standard 13 and shown in Fig. 12 of the drawings. The shaft 37 has a suitable horizontal slot 40 for the purpose of receiving the point of a dog 41, which is pivoted in a recess 42 of each numeral-disk referred to. The shaft 37 is provided with a hand-wheel 43 to revolve said shaft. Therefore said numeral-disks are revolved by means of a dog 41 in each disk in order to bring all the numeral-disks to the starting-point or to zero. The dog 41 is retained in position to the shaft 37 by means of the retaining-spring 44. The dog 41 and the spring 44 are in the sunken part or recess 42 of the numeral-disks. (Shown in Fig. 11 of the drawings.) The dogs 41 of the numeral-disks are all in horizontal line when the numeral-disks are at zero. The revoluble transferring-shaft 45 is journaled in the stationary standards 12 and 13. The adding-device frame 38 rocks on the shaft 45 when the adding-device frame is operated. A sleeve 46 between the sides 38 of the adding-device frame is secured to the shaft 45. The sleeve has a number of arms 47 on the periphery of said sleeve 46. Said arms 47 are separate from each other and at different positions on the sleeve and when revolved are opposite to the transfer-levers 51 to consecutively engage the same.

At the right-hand side of each numeral-disk 32, 33, and 34 and forming a part of the same is a spur-wheel 48, which gears into the segments 29, 30, and 31, respectively. Adjoining each spur-wheel 48 is a ratchet-wheel 49, forming a part of the numeral-disks.

The numeral-disks 32, 33, 34, and 35 are provided with a cam-wheel 50 at the left-hand side of said disks and forming a part thereof, and shown in Fig. 10 of the drawings.

In Fig. 6 of the drawings is shown a lever 51, pivoted to the bar 52 of the adding-device frame 38. The lip of the cam 50 of the numeral-disk engages with the point of the lever 51 when the disk revolves, and consequently the lower part of the lever 51 is thrown inward, sliding along the face of the trip 54 until the points of the lever and the trip pass each other. The arms 53 are pivoted to the levers 51 and engage with the ratchet-wheels 49 of the numeral-disks when operated. The retaining-trip 54 is pivoted to the rod 55 of the adding-device frame 38, and is provided with a tension-pull spring 56. When the point of the lever 51 and the point of the trip 54 have passed each other, then the inner lip of the trip 54 engages the outer part of the lever 51 by means of the spring 56 and retains the lever until an arm 47 of the transferring-sleeve 46 strikes the end of the lever and carries the same to normal position. The retaining-trip 54 engages the lower and outer triangle part of the lever 51 and retains the same in normal position, as shown in Fig. 6 of the drawings, and also retains said lever 51 in relative position to be acted upon by one of the arms 47 of the sleeve 46. The arm 53 is pivoted to the lever 51 and engages with the ratchet-wheel 49 of the numeral-disks to revolve the same.

The numeral-disks 33, 34, 35, and 36 are operated by the arms 53 and levers 51 by means of the transferring-sleeve 46.

The shaft 58 is journaled in the standards 3 and 13 and is shown in Figs. 7 and 8 of the drawings. The shaft 58 has a spur-wheel 59, which revolves the spur-wheel 60, secured on the shaft 45, by means of intermediate gear-wheels 61 and 62 on center studs of the standard 13.

The shaft 58 has a spur-wheel 63 and a retaining-cam 64, secured thereto and shown, respectively, in Figs. 9 and 7 of the drawings. The cam 64 has diametrically opposite depressions 65 on its periphery to receive the retaining-roller 66 of the lever 67, which is fulcrumed at 68 of the standard 3.

The retaining-cam 69 revolves on the stud 70. (Shown in Figs. 7 and 15 of the drawings.) The cam 69 has diametrically opposite depressions 71 on its periphery to receive the retaining-spring-impelled roller 72 of lever 73, which is fulcrumed at 74 on the standard 3. The lever 73 has a tension-spring 73ª secured thereto and to the frame 3. The depression 71 of the cam 69 must be sufficiently inclined to allow the roller freedom to revolve the cam slightly when coming to normal position. A spur-wheel 75 is secured to the cam 69 and is operated by the double rack 76, the lower end of which is pivoted at 77 to the key-coupler 20, previously referred to. The double rack 76 when lifted revolves the spur-wheel 75 almost one-half revolution. The said one-half revolution of the spur-wheel 75 is completed by means of the pressure of the spring-impelled roller 72 on the cam 69 in Figs. 7 and 15 of the drawings.

The upper and outer part of the double rack 76 is suitably inclined in order to facilitate its operation. The upper part of the double rack 76 has a side pin or roller 79 to make a circuit around a suitable stationary guide 80 on the standard 3. 81 represents casings with spring-plungers 82 to engage with the inclined upper parts of the double rack 76. The said spring-plungers 82 have springs 82² to press the plungers 82 to the double rack to afford proper tension and stability to the upper part of the double rack 76 when the same is making its circuit.

When the double rack 76 is lifted upward by means of any one of the previously-mentioned operating-keys and the key-coupler 20, the spur-wheel 75 is revolved about one-half revolution, and when the double rack is brought downward by means of the weight of the key-coupler 20, assisted by a pulling-spring 21¹, connected to the key-coupler 20 and to the bar 7, the spur-wheel 63, together with its shaft 58, is revolved about one-half revolution. The cam 69 on stud 70 has a spur-wheel 83 forming a part of the cam.

The wheel 83 on the stud 70 gears into a smaller spur-wheel 84, which is secured on the shaft 85, which is journaled in the standards 12 and 13. The wheel 83 is capable of revolving one complete revolution. The shaft 85 has also a ratchet-wheel 86 secured thereto and shown in Fig. 8 of the drawings. A dog 87, provided with a pull-spring 88, secured to the standard 13, engages the ratchet-wheel 86 to hold said ratchet-wheel, thereby necessitating the depression of any one key to its full extent.

On the shaft 85 and midway between the standards 12 and 13 and shown in Figs. 1 and 13 of the drawings is an adding-device rocking cam 89, secured to the shaft 85. A roller 90 is journaled in the lower part of the adding-device frame 38. When the cam 89 is revolved one complete revolution by means of the depression of any one key, the roller 90 on shaft 90¹, journaled in the adding-device frame 38, rolls into the depression 91 in the periphery of the cam 89, thereby allowing the adding-device numeral gear-wheels 48 to drop out of mesh with the segments 29, 30, and 31 by means of the pulling-spring 138, which is connected to lower front part of the frame 38 and to the stationary bar 4.

The adding-device frame is pivoted on the shaft 45, which is journaled in the standards 12 and 13 of the machine.

The units lifting-rod 92 is pivoted at 93 to the rear part of the units-key 15, as shown in Figs. 1 and 5 of the drawings. When the key 15 is depressed, the lifting-rod 92 is raised, the lip 94 of said rod 92 engages the roller 24 of the units section-frame 23, and lifts the roller 24, together with its frame 23, and partly revolves the shaft 22, together with its segments 29.

The tens-of-units lifting-rod 96 is pivoted at 97 to the rear part of the tens-of-units key 16, as shown in Figs. 1 and 8 of the drawings. When the key 16 is depressed, the lip 98 of said rod 96 engages the roller 26 of the tens-of-units section-frame 25 and lifts the roller 26, together with its frame, thereby partly revolving the segment 30 loosely on the shaft 22.

The tens-of-hundreds lifting-rod 100 is pivoted at 101 to the rear part of the hundreds-of-units key 18, as shown in Figs. 1 and 6 of the drawings. When said key 18 is depressed, the lifting-rod 100 is raised, the lip 102 of the lifting-rod 100 engages with the roller 28 of the hundreds-of-units section-frame 27, and lifts the roller 28, together with its frame 27, thereby partly revolving the hundreds-of-units segment 31 loosely on the shaft 22.

All the operating-keys operate in a similar manner on their common horizontal fulcrum-bar 19, and the rear ends of the keys rest on the horizontal bar 8. The horizontal bar 5 forms a stop for the keys when depressed. The horizontal stationary bar 103, (shown in Figs. 5, 6, 7, and 8 of the drawings,) extends from standard 2 to standard 3 and has, together with the stationary stop-bar 5, a number of holes for the vertical sliding rods 104 to slide through. The lower ends of the sliding rods 104 extend below the stationary bar 5 and immediately above the rear end of the operating-keys. The sliding rods 104 have a rest-pin 140. When the coupler 20 is being raised, the pulling-spring plunger 1411 in casing 1422 of the coupler 20 comes in contact with the oblique flange 143 of the lever 144. The said lever 144 is pushed toward the rear by said plunger 141, thereby allowing pin 140 of the sliding rod 104 to pass the horizontal rest 145, as shown in Fig. 7 of the drawings. When the coupler 20 is raised to its highest limit, the spring-plunger 1411 passes over the oblique flange 143 of the spring-impelled lever 144. The lever 144 has a tension pull-spring 1441 at its lower end. The spring 1412 (shown in Fig. 24 of the drawings) draws the plunger 1411 from said flange 143. The rest-bar 145 of the lever 144 then falls under the pin 140. As the coupler 20 descends the pin 140 rests on the rest 145 of the lever 144 and the plunger 141 slides downward on the oblique flange 143, and previous to the coupler 20 assuming normal position the plunger 141 passes under the oblique flange 143. One of the levers 144 is fulcrumed at 147 to the standard 3, and a similar one is fulcrumed in a similar manner to the standard 2 and operates in a similar manner. The rest-bar 145 extends from the lever 144 of standard 3 to a similar lever on standard 2 of the machine. When any one key is depressed, the rear end of said key comes in contact with the lower end of the sliding rod 104 and lifts said sliding rod.

The upper ends of the sliding rods 104 are bent toward the rear of the machine and indicated at 105 and pass underneath the levers 106, pivoted at 107 on the rear part of the machine and shown in Figs. 4 and 5 of the drawings.

The upper ends of the connecting-rods 108 are pivotally connected to the levers 106 at 109. The lower ends of the rods 108 are pivotally connected at 110 to the levers 112. One end of the levers 112 are pivotally connected to the stationary bracket 113 on the horizontal bar 9. The vertical rods 114 are capable of sliding through holes in the horizontal bars 6 and 9. The upper ends of the rods 114 are provided with suitable tablets 115 for indicating the amount of each purchase. The other ends of the levers 112 are pivotally connected to the tablet-rods 114 by means of a suitable slot 116 in the end of the lever 112 and a pin 117 in said slot and on said rod 114. The said bent end 105 of the sliding rod 104 when raised by means previously mentioned lifts the lever 106 and 112 by means of the connecting-rods 108, and consequently the tablet-rod 114, together with the tablet 115, to the required height.

In Fig. 5 of the drawings is shown the coupler 20, provided with a trip 120, fulcrumed to said coupler and which engages the lower end of the bell lever-hammer 121, pivoted at 122 to the standard 10. When said coupler 20 is raised to its highest limit by means of any one of the operating-keys, the hammer 121 is released from contact with the trip 120 and strikes the bell 123 by means of the pull-string 124, attached to the lower part of the hammer 122 and to the standard 10. A pull-spring 125 connects the end of the trip 120 with the coupler 20 to allow tension to the trip and to retain the same in normal position with the coupler 20 when the same is down. The rounded end of the hammer 121 and the trip 120 at their engaging parts facilitate the operation of the same.

In Fig. 16 of the drawings is shown the rear part of a drawer 130, which is broken. When the coupler 20 is raised, the end of the coupler engages with the lip 131 of the bent lever 132, the front end of which is pivoted to the bracket 133 of a convenient standard of the machine. The vertical slidable rod 134 is pivoted at 135 to the rear end of the lever 132. The rod 134 is capable of sliding through openings in the bars 6 and 136 of the machine when the lever 132 is raised. The lip 137 of the drawer 130 is released in consequence of the raising of the rod 134. The drawer may then be opened. The lip 137 of the drawer 130 is fulcrumed at 150 to the bracket 151, secured to the rear part of the drawer 130, in which a spiral spring 152 is inserted to maintain a tension to the lip 137. Said bracket 151 is provided with a set-screw 153 to adjust the lip 137, that the same may engage the bolt 134 more or less.

When the numeral-disks are at zero, the cams 50 of said disks have engaged the transfer-levers 51 and thrown them toward the front, thereby operating the spring-impelled trips 54, and at the same time the arms 53 engage the ratchet-wheels 49 one tooth lower. When the arms 47 of the transferring-sleeve 46 consecutively engage their respective transferring-levers 51, causing the trips 54 to resume normal position, the arms 53 revolve the ratchet-wheels 49, together with their numeral-disk wheels, one tooth.

The retaining-pawl 140 is pivoted at 141 and engages the ratchet-wheel 49 to retain the same in position by means of the spring 142, connected to the lower end of the pawl 140 and to a horizontal bar 142 of the frame 38. (Shown in Fig. 6 of the drawings.)

The indicating-tablets 115 are operated by the depression of the units-keys 15, the tens-of-units keys 16, and the hundreds-of-units keys 18 by means of the vertical rods 104, with upper parts 105 bent toward the rear of the machine, engaging with and lifting the rods 106, thereby lifting the vertical tablet-rods 114 by means of the rods 108 and connecting-levers 112.

The indicating-tablets 115$^a$ are operated by the depression of the units-keys 15, the tens-of-units keys 16, and the hundreds-of-units keys 18 by means of the vertical rods 104$^a$, with upper parts 105$^a$ bent toward the rear of the machine, engaging with and lifting the rods 106$^a$, thereby lifting the vertical tablet-rods 114$^a$ by means of rods 108$^a$ and connecting-levers 112$^a$. (Shown in Figs. 22 and 23 of the drawings.)

The indicating-tablets 115$^b$ are operated by the depression of the units-keys 15, the tens-of-units keys 16, and the hundreds-of-units keys 18 by means of the vertical rods 104$^b$, with upper parts 105$^b$ bent toward the rear of the machine, engaging with and lifting the vertical tablet-rods 114$^b$ by means of rods 108$^b$ and connecting-levers 112$^b$. (Shown in Figs. 22 and 23 of the drawings.)

The operation of the machine is as follows: When a units-key 15 is pressed downward, a lifting-rod 92, positively connected to the same, is lifted. Consequently the units-roller 24, together with the units-frame 23, is raised by means of the lip 94 of said lifting-rod. At this time the tens-of-units frame 25 is also raised, thereby partly revolving the tens-of-units segment 30. (Shown in Figs. 3 and 8 of the drawings.) When the hundreds-of-units key 18 is pressed downward, a lifting-rod 100, positively connected to the same, is lifted. Consequently the hundreds-of-units roller 28, together with its frame 27, is raised by means of the lip 102 of said lifting-rod engaging said roller 28. At this time the hundreds-of-units frame 27 is also raised, thereby partly revolving the hundreds-of-units segment 31. (Shown in Figs. 3 and 6 of the drawings.) The lips 94 of the units-lifting rods 92, the lips 98 of the tens-of-units lifting-rods 96, and the lips 102 of the hundreds-of-units lifting-rods 100 engage with their respective rollers 24, 26, and 28 in order to revolve their respective segments 29, 30, and 31. At the depression of any one of the operating-keys the coupler 20 is lifted, thereby lifting the double rack 76. The teeth of one edge of the rack 76 revolve the spur-wheel 75, together with its cam 69 and spur-wheel 83. At this time the spur-wheel 84 is revolved by means of the spur-wheel 83. The wheel 84 is secured to the shaft 85, revolving said shaft and also the adding-device rocking cam 89 and the ratchet-wheel 86, secured on said shaft 85. When the double rack 76 is lifted to its highest limit, it is thrown over the guide 80 by means of the front spring-plunger 82. The spur-wheel 75 is then free from contact with the double rack 76 and proceeds to finish its one-half revolution by means of the spring-compressed roller 72. At the time the double rack 76 is at its highest point and before being thrown over the guide 80 the numeral-disk's spur-wheels 48 are in contact with various segments 29 30 31. The pin 79 of the rack 76 is allowed to pass over the top of the guide 80 without the teeth of said rack binding in the teeth of the wheel 75 on account of the lower part of the rack being carried inward and away from the wheel 75 by the coupler 20, to which the lower part of the rack 76 is pivoted. When the spring-compressed roller 72 has completed the one-half revolution of spur-wheel 75, it allows the adding-device spur-wheels 48 to drop out of contact with said segments 29 30 31 by means of the depression in cam 89 and pulling-spring 138, secured to the lower part of the frame 38 and to the bar 4. (Shown in Fig. 6 of the drawings.) At the depression of any one key the adding-device spur-wheels 48 are locked into gear with the segments 29, 30, and 31 by means of the depression-cam 89 and the roller 90. (Shown in Fig. 6 of the drawings.) When the double rack 76 is thrown over the guide 80, it then engages with the spur-wheel 63, secured to shaft 58, and in descending revolves the wheel 63 one-half revolution with its shaft 58, together with the spur-wheel 59 on said shaft, thereby revolving the spur-wheel 60 by means of the intermediate gear-wheels 61 and 62. The spur-wheel 60 revolves the shaft 45, (shown in Fig. 8 of the drawings,) together with its transferring-sleeve 46. The arms 47 of said sleeve 46 engage the transferring-levers 51, as shown in Fig. 6 of the drawings. When the double rack 76 has descended to its lowest and normal position, as shown, the rear spring-impelled plunger 82 forces the upper part of the double rack 76 underneath the guide 80 and into gear with the spur-wheel 75. In order to indicate each purchase to the customer, when a key is depressed the bent slidable lifting-rod 104 is raised by means of the rear end of the key. The bent end 105 of said rod 104 raises the indicator-rod 114 by means of the levers 106 and 112 and their connecting-rod 108.

Various changes in the form, proportion, and minor details of my invention may be resorted to without departing from the spirit and scope thereof.

What I claim as my invention, and desire to secure by Letters Patent, is—

1. In a cash-register, the combination with a movable adding-frame and adding mechanism carried thereby, of means for moving said adding-frame, means for operating the moving means aforesaid to bring it to a predetermined position, and means thereupon acting to give the adding-frame-operating means a quick or snap action to move the adding-frame.

2. In a cash-register, the combination with a movable adding-frame and adding mechanism carried thereby, of means for moving the adding-frame, means for operating the moving means aforesaid upon the manipulation of a key to bring the moving means to a predetermined position, means for thereupon disengaging the operating means from the moving means, and independent mechanism thereupon acting to give the adding-frame-moving means a quick or snap action independently of the previous operation of said adding-frame-moving means.

3. In a cash-register, the combination with a movable adding-frame, of adding mechanism carried thereby, means for moving the adding-frame, a cam coöperating with the adding-frame-moving means and having depressions, means for turning said cam to operate the adding-frame-moving means to bring it to a predetermined position, means for thereupon disengaging the operating means from the cam, and a spring-actuated member thereupon passing into the depression in the cam and adapted to give the cam and the adding-frame-moving means a quick or snap action to cause the adding-frame-moving means to actuate the adding-frame.

4. In a cash-register, the combination with a movable adding-frame, and adding mechanism carried thereby, of a rotary cam having a depression, an adding-frame-operating rotary cam having a depression, a member on the adding-frame adapted at a predetermined time to pass into the depression, means to thereupon cause the movement of the adding-frame, an operating-cam having a depression, said cam coacting with the cam first named, key-operated means for operating the last-named cam, means for disengaging said key-operated means from the cam at a predetermined time, and a spring-actuated member adapted to enter the depression in the operating-cam and thereupon to impart to said cam and to the adding-frame-moving cam a quick or snap action to cause the member on the adding-frame to pass into the depression on the adding-frame-moving cam and thereupon cause a quick or snap action of the adding-frame.

5. In a cash-register, the combination with a movable adding-frame, of adding mechanism carried thereby, means for operating the adding mechanism from which said adding mechanism becomes disengaged on the shifting of the adding-frame, means operated by the action of the keys to operate the adding-mechanism-actuating means, means for moving the adding-frame to cause the disengagement aforesaid, means operated by the movement of the keys to set said adding-frame-moving means, independent means thereupon acting adapted to give a quick or snap movement to the adding-frame-actuating means to move the adding-frame and disengage the adding mechanism from the mechanism operating said adding mechanism.

6. In a cash-register, the combination with a movable adding-frame, of adding mechanism carried thereby, of key-operated means adapted to engage and actuate the adding mechanism, said adding mechanism being disengageable from said operating means on the movement of the frame, a pinion, a rack operated from the keys for turning said pinion, means operated from the pinion to move the adding-frame and which is set by the movement of the rack, means to thereupon throw the rack out of mesh with the pinion, and independent means adapted to thereupon impart a further and snap action to the pinion, to cause the adding-frame mechanism to quickly move the adding-frame.

7. In a cash-register, the combination with a movable adding-frame, of adding mechanism carried by the frame, means for operating adding mechanism which is actuated from the keys and from which said adding mechanism is disengaged on the movement of the frame, a rack actuated by the keys, a pinion turned by the rack, a cam turned by the pinion, means set by the pinion adapted to actuate the adding-frame, means for disengaging the rack from the pinion, and a spring-actuated member adapted to thereupon coöperate with the cam to impart to it a quick or snap action to cause a snap action of the adding-frame-operating means and consequent disengagement of the adding mechanism from the actuating mechanism.

8. In a cash-registering machine, a horizontal transfer-shaft, journaled in the machine, an adding-device frame loosely journaled on the shaft, transferring-levers with arms journaled in the frame and spring-impelled trips pivoted in the frame and connected with said levers to retain the said transferring-levers, substantially as set forth.

9. In a cash-registering machine, a slidable drawer, a bracket secured to the drawer, a spring-trip pivotally connected to the bracket, a lever pivotally connected to the machine, a drawer-bolt pivotally connected to the said lever and means to raise said bolt to release the drawer at the depression of a key, substantially as set forth.

10. In a cash-registering machine, a vertical slidable rod, with upper end extension, a lever pivotally connected to the machine and capable of being raised by said extension, a vertical indicating tablet-rod with tablet, a secondary lever fulcrumed to the machine and pivotally connected to said tablet-rod by means of a slot, a rod pivotally connecting said levers and a key for raising the tablet-rod, substantially as set forth.

11. In a cash-registering machine, bent levers with oblique flanges pivotally connected to the machine, a horizontal rest-bar connecting said levers, vertical sliding rods, pins on the sliding rods to rest on the rest-bars, a key-coupler journaled to the machine, spring-plungers on said coupler to engage the oblique flanges, and pull-springs connected to the lower part of said levers and to the machine and means to operate said rest-bar by the depression of a key, substantially as set forth.

12. In a cash-registering machine, a bell secured to the machine, a bell-hammer fulcrumed to the machine, a key-coupler, a trip fulcrumed to the coupler, a spring connected to the trip and to the coupler to allow engagement of the trip and the hammer and a spring connected to the hammer and to the machine, a key to trip the hammer, substantially as set forth.

13. In a cash-registering machine, a drawer, provided with a bracket secured to the rear part thereof, a lip pivotally connected to the bracket, a spring in the drawer to raise the forward end of the lip, a set-screw through the rear end of the bracket to engage with and adjust the lip, a slidable rod on the machine in proximity to the lip and means for raising said rod to release the drawer, substantially as set forth.

14. In a cash-register, the combination with a movable adding-frame, of adding mechanism carried thereby, transfer mechanism for effecting the transfers on the adding mechanism, key-operated means for operating the adding mechanism from which the adding mechanism is adapted to become disengaged, independent and independently-movable members one of which coöperates with the transfer mechanism and the other adapted to accomplish movement of the adding means, key-operated means adapted to engage and operate one of said members and thereafter adapted to engage and operate the other of said members, and means for causing the aforesaid action of the key-operated means.

15. In a cash-register, the combination with a movable adding-frame, of adding mechanism carried thereby, means for moving the frame, actuating mechanism for the adding mechanism, from which the adding mechanism is disengaged on movement of the adding-frame, a double rack operated by the keys, independent and independently-operated pinions, one of said pinions coacting with the adding-frame-operating means, transfer mechanism for effecting the transfers on the adding mechanism, said transfer mechanism being operated by the other pinion, and means for causing the rack to first engage with one of the pinions and operate it and thereafter to disengage with said pinion and mesh with the other pinion and operate said other pinion.

16. In a cash-register, the combination with adding mechanism, of means for shifting said adding mechanism, transfer mechanism, means, independent of the means for shifting the adding mechanism, for operating the transfer mechanism, a key-operated bar adapted to operate the said independent means independently of each other at different times, means for guiding the bar, and independent spring-actuated plungers coöperating with the bar to cause the lateral shifting thereof from one side of the guide to the other side thereof.

17. In a cash-register, the combination with adding mechanism, of means for shifting said adding mechanism, a pinion for operating said shifting means, transfer mechanism, a pinion for operating said transfer mechanism, a key-operated double rack, a shiftable roller, a guide for accomplishing the lateral shifting of the rack to cause it to first engage one pinion and then to disengage from said pinion and engage the other pinion, and opposing spring-actuated plungers coacting with the rack to cause it to shift laterally.

In testimony whereof I affix my signature in presence of two witnesses.

STEPHEN HARRY POCOCK.

Witnesses:
   JOHN H. HENDRY,
   W. S. MCBRAYNE.